US007246940B2

(12) United States Patent
Storm et al.

(10) Patent No.: US 7,246,940 B2
(45) Date of Patent: Jul. 24, 2007

(54) METHOD AND APPARATUS FOR MANAGING THE TEMPERATURE OF THERMAL COMPONENTS

(75) Inventors: Bruce H. Storm, Houston, TX (US); Haoshi Song, Sugar Land, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 10/602,236

(22) Filed: Jun. 24, 2003

(65) Prior Publication Data

US 2004/0264543 A1    Dec. 30, 2004

(51) Int. Cl.
*G01K 13/02* (2006.01)
*G01K 1/12* (2006.01)
*G01K 1/16* (2006.01)
*F28D 15/04* (2006.01)

(52) U.S. Cl. .................. 374/136; 374/141; 62/3.7; 62/259.2; 165/104.33

(58) Field of Classification Search .......... 374/140, 374/141, 4–5, 137, 136; 702/130; 62/3, 62/7; 165/104.11, 104.21; 250/253; 73/154, 73/152.01, 152.33

See application file for complete search history.

(56) References Cited

U.S. PATENT DOCUMENTS

| | | | | |
|---|---|---|---|---|
| 4,134,462 A | * | 1/1979 | Clay | 175/16 |
| 4,164,253 A | * | 8/1979 | Skala | 165/104.14 |
| 4,375,157 A | * | 3/1983 | Boesen | 62/49.2 |
| 4,403,645 A | * | 9/1983 | MacCracken | 165/10 |
| 4,407,136 A | * | 10/1983 | de Kanter | 62/64 |
| 4,449,164 A | * | 5/1984 | Carlson et al. | 361/694 |
| 4,479,383 A | | 10/1984 | Bravenec | |
| 5,165,243 A | * | 11/1992 | Bennett | 62/6 |
| 5,456,081 A | * | 10/1995 | Chrysler et al. | 62/3.7 |
| 5,701,751 A | * | 12/1997 | Flores | 62/169 |
| 5,713,208 A | * | 2/1998 | Chen et al. | 62/3.7 |
| 5,727,618 A | | 3/1998 | Mundinger et al. | |
| 5,737,923 A | * | 4/1998 | Gilley et al. | 62/3.7 |
| 5,771,984 A | * | 6/1998 | Potter et al. | 175/14 |
| 5,901,037 A | * | 5/1999 | Hamilton et al. | 361/699 |
| 5,977,785 A | | 11/1999 | Burward-Hoy | |
| 6,084,770 A | * | 7/2000 | Wyland | 361/692 |
| 6,200,536 B1 | | 3/2001 | Tonkovich et al. | |
| 6,201,221 B1 | * | 3/2001 | LaGrotta et al. | 219/483 |
| 6,341,498 B1 | | 1/2002 | DiFoggio | |

(Continued)

OTHER PUBLICATIONS

Georgia Tech University, Single Phase Micro-Fluid Loop for Cooling of Microelectronic Devices; printed Sep. 3, 2002; http://www.me.gatech.edu/yogendra.joshi/METTL/projects/ current/wei/single_phase_micro.htm.

(Continued)

*Primary Examiner*—Gail Verbitsky
(74) *Attorney, Agent, or Firm*—Conley Rose, PC

(57) ABSTRACT

A temperature management system for managing the temperature of a discrete, thermal component. The temperature management system comprises a heat exchanger thermally coupled with the thermal component. The system also comprises a fluid transfer device that circulates a coolant fluid through a thermal conduit system. As the coolant flows through the heat exchanger, it absorbs heat from the component. Upon exiting the heat exchanger, the heated coolant flows to the beat sink where the heat sink absorbs heat from the coolant fluid.

67 Claims, 7 Drawing Sheets

U.S. PATENT DOCUMENTS

| | | | |
|---|---|---|---|
| 6,411,512 B1* | 6/2002 | Mankaruse et al. | 361/700 |
| 6,415,612 B1* | 7/2002 | Pokharna et al. | 62/3.2 |
| 6,432,497 B2* | 8/2002 | Bunyan | 428/40.1 |
| 6,481,216 B2* | 11/2002 | Simmons et al. | 62/6 |
| 6,501,654 B2* | 12/2002 | O'Connor et al. | 361/699 |
| 6,519,955 B2* | 2/2003 | Marsala | 62/119 |
| 6,557,354 B1* | 5/2003 | Chu et al. | 62/3.2 |
| 6,590,770 B1* | 7/2003 | Rogers et al. | 361/697 |
| 6,644,395 B1* | 11/2003 | Bergin | 165/185 |
| 6,670,605 B1* | 12/2003 | Storm et al. | 250/255 |
| 6,687,126 B2* | 2/2004 | Patel et al. | 361/702 |
| 6,769,487 B2* | 8/2004 | Hache | 166/302 |
| 6,799,429 B2* | 10/2004 | Drube et al. | 62/50.2 |
| 6,834,671 B2* | 12/2004 | Cotte et al. | 137/528 |
| 6,864,417 B2* | 3/2005 | Bechis et al. | 174/15.1 |
| 6,898,529 B2* | 5/2005 | Gao et al. | 702/11 |
| 6,934,154 B2* | 8/2005 | Prasher et al. | 361/699 |
| 2002/0033247 A1* | 3/2002 | Neuschutz et al. | 165/10 |
| 2002/0039280 A1* | 4/2002 | O'Connor et al. | 361/690 |
| 2002/0144811 A1* | 10/2002 | Chou et al. | 165/236 |
| 2002/0159237 A1* | 10/2002 | Patel et al. | 361/719 |
| 2003/0061824 A1* | 4/2003 | Marsala | 62/119 |
| 2003/0097846 A1* | 5/2003 | Novotny et al. | 62/3.7 |
| 2003/0110788 A1* | 6/2003 | Koeneman et al. | 62/259.2 |
| 2003/0116302 A1* | 6/2003 | Sauciuc et al. | 165/10 |
| 2003/0136548 A1* | 7/2003 | Parish et al. | 165/104.21 |
| 2003/0152764 A1* | 8/2003 | Bunyan et al. | 428/328 |
| 2003/0178177 A1* | 9/2003 | Eytcheson et al. | 165/80.2 |
| 2003/0178178 A1* | 9/2003 | Breuer et al. | 165/80.2 |
| 2003/0183375 A1* | 10/2003 | Clarksean | 165/132 |
| 2004/0042176 A1* | 3/2004 | Niwatsukino et al. | 361/699 |
| 2004/0079100 A1* | 4/2004 | Monfarad | 62/259.2 |
| 2005/0011199 A1* | 1/2005 | Grisham et al. | 62/3.7 |
| 2005/0097911 A1* | 5/2005 | Revellat et al. | 62/259.2 |
| 2006/0086484 A1* | 4/2006 | Hegde | 165/104.33 |
| 2006/0117759 A1* | 6/2006 | Hall et al. | 62/3.2 |
| 2006/0213660 A1* | 9/2006 | DiFoggio et al. | 166/254.2 |

OTHER PUBLICATIONS

Georgia Tech University; Smart Thermal Management Systems Based on Solid Liquid Phase Change Materials; printed Sep. 3, 2003; http://www/me.gatech.edu/yogendra.joshi/METTLA/projects/current/dong/dong.htm.

Defense Advanced Research Projects Agency (DARPA); HERETIC program Overview; printed Sep. 3, 2002; http://www/darpa.mil/MTO/HERETIC/overview.html.

* cited by examiner

METHOD AND APPARATUS FOR MANAGING THE TEMPERATURE OF THERMAL COMPONENTS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to temperature management systems. More particularly, the present invention relates to systems for managing the temperature of discrete thermal components.

2. Description of the Related Art

To drill a well, a drill bit bores thousands of feet into the crust of the earth. The drill bit extends downward from a drilling platform on a string of pipe, commonly referred to as a "drill string." The drill string may be jointed pipe or coiled tubing. At the lower, or distal, end of the drill string is a bottom hole assembly (BHA), which includes, among other components, the drill bit.

In order to obtain measurements and information from the downhole environment while drilling, the BHA includes electronic instrumentation. Various tools on the drill string, such as logging-while-drilling (LWD) tools and measurement-while-drilling (MWD) tools incorporate the instrumentation. Such tools on the drill string contain various electronic components incorporated as part of the BHA. These electronic components generally consist of computer chips, circuit boards, processors, data storage, power converters, and the like.

Downhole tools must be able to operate near the surface of the earth as well as many thousands of feet below the surface. Environmental temperatures tend to increase with depth during the drilling of the well. As the depth increases, the tools are subjected to a severe operating environment. For instance, downhole temperatures are generally high and may even exceed 200° C. In addition, pressures may exceed 20,000 psi. In addition to the high temperature and pressure, there is also vibration and shock stress associated with operating in the downhole environment, particularly during drilling operations.

The electronic components in the downhole tools also internally generate heat. For example, a typical wireline tool may dissipate over 100 watts of power, and a typical downhole tool on a drill string may dissipate over 10 watts of power. Although there is electrical power dissipated by a drill string tool, the heat from the drilling environment itself still makes internal heat dissipation a problem. The internally dissipated heat must be removed from the electronic components or thermal failure will occur.

While performing drilling operations, the tools on the drill string typically remain in the downhole environment for periods of several weeks. In other downhole applications, drill string electronics may remain in the downhole for as short as several hours to as long as one year. For example, to obtain downhole measurements, tools are lowered into the well on a wireline or a cable. These tools are commonly referred to as "wireline tools." However, unlike in drilling applications, wireline tools generally remain in the downhole environment for less than twenty-four hours.

A problem with downhole tools is that when downhole temperatures exceed the temperature of the electronic components, the heat cannot naturally dissipate into the environment. The heat will accumulate internally within the electronic components unless there are provisions to remove the heat. Thus, two general heat sources must be accounted for in downhole tools, the surrounding downhole environment and the heat dissipated by the tool components, e.g., electronics components.

While the temperatures of the downhole environment may exceed 200° C., the electronic components are typically rated to operate at no more than 125° C. Thus, due to the extended time downhole, heat transfer from the downhole environment and the heat dissipated by the components will result in thermal failure of those components. Generally, thermally induced failure has two modes. First, the thermal stress on the components degrades their useful lifetime. Second, at some temperature, the electronics fail and the components stop operating.

Thermal failure is very expensive. The expense is not only due to the replacement costs of the failed electronic components, but also because electronic component failure interrupts downhole activities. Trips into the borehole also use costly rig time. An effective apparatus and method to cool electronic components in downhole tools would greatly reduce costs incurred during downhole operations associated with thermal failure.

A traditional method of cooling the electronics in a downhole tool involves modest environmental temperatures, such as may be found near the surface of the earth. Near the surface of the earth, the electronics operate at a temperature above the environmental temperature. In modest environments, the electronics are thermally connected to the tool housing. The thermal connection allows the heat to dissipate to the environment by the natural heat transfer of conduction, convection, and/or radiation. Temperature gradient cooling will only work, however, if the temperature gradient between the electronics and the environment is large enough to adequately cool the electronics.

A traditional method for reducing thermal failure in harsh thermal environments, such as thousands of feet below the surface of the earth, is to place the electronics on a chassis in an insulated vacuum flask. The vacuum flask acts as a thermal barrier to retard heat transfer from the downhole environment to the electronics. However, thermal flasks are passive systems that only slow the harmful effects of thermal failure. Because of the extended periods downhole in both wireline and drill string operations, insulated flasks do not provide sufficient thermal management for the electronic components for extended periods. Specifically, the flask does not remove the heat generated internally by the electronic components. Further, a thermal mass, such as a eutectic material, can be included in the flask to absorb heat from the downhole environment as well as the heat generated internally by the electronics. However, both the thermal flask and the thermal mass are only used to thermally manage the temperature of the interior of the electronics compartment. Because the discrete components are internally generating heat, they will remain at a higher temperature than the general interior of the electronics compartment. Thus, thermal failure continues to be a problem.

Another cooling method for deep-well cooling uses an active cooling system to cool electronics in a downhole tool. In this method, water in one tank is in thermal contact with the electronics chassis of the downhole tool. The water absorbs heat from the downhole environment and the electronics and begins to vaporize at 100° C. so long as the pressure of the tank is maintained at $1.01 \times 10^5$ Pa (14.7 psi). In order to maintain the pressure, the steam is removed from the tank and compressed in a second tank. However, sufficient steam must be removed from the first tank in order to maintain the pressure at $1.01 \times 10^5$ Pa. Otherwise, the boiling point of the water will rise and thus raise the temperature of the electronics chassis in the first tank.

In practice, active steam cooling has significant problems. First, this method has very large compression requirements because the compressed steam in the second tank cools to the temperature of the downhole environment. The compressor must be able to compress the steam to a pressure greater than the saturation pressure of steam at the temperature of the downhole environment, which is $1.55 \times 10^6$ Pa (225 psi) at 200° C. Second, this method is also time limited based on the amount of water in the first tank because when all the water in the first tank vaporizes, the cooling system will not function. In addition, the method does not isolate the electronic components but instead attempts to cool the entire electronics region. While the temperature of the region may remain at 100° C., the temperature of the discrete electronic components will be higher because they are internally generating heat. Consequently, this system does not effectively maintain the temperature of the discrete electronic components in order to minimize the effects of thermal failure.

Another cooling method attempts to resolve the problem of the high compression requirements of the above-mentioned cooling system by use of a sorbent cooling system. This method again uses the evaporation of a liquid that is in thermal contact with the electronic components to maintain the temperature of the components. Instead of using a compressor to remove the vapor, this method uses desiccants in the second tank to absorb the vapor as it evaporates in the first tank. However, the desiccants must absorb sufficient vapor in order to maintain a constant pressure in the first tank. Otherwise, the boiling point of the liquid will rise as the pressure in the lower tank rises.

Like the previous method, the sorbent cooling system also has significant problems. First, sorbent cooling only cools the entire electronics region, not the discrete electronic components. Thus, because of internal heat dissipation, the electronic components may remain at a higher temperature than the entire electronics region. Second, the desiccants must absorb sufficient vapor in order to maintain a constant temperature in the first tank. Otherwise, the liquid will evaporate at a higher temperature and thus the temperature in the first tank will increase. Further, the amount of water in the first tank limits the system. Once all the water evaporates, the system no longer functions.

Other methods also cool electronics apart from downhole applications. For example, micro-channel heat exchangers cool microprocessors and other microelectronic devices in surface-based applications. However, these systems operate in an environment where the ambient temperature is less than the device being cooled. In a downhole environment, the ambient temperature is often higher than the recommended operating temperature of the components being cooled. These methods will not function properly in a downhole environment because they cannot remove the heat from the components in an environment where the ambient temperature is higher than that of the components.

None of the known cooling methods effectively and efficiently controls the temperature of electronic components in downhole tools. An effective cooling system for electronic components in downhole tools is one that performs at least one or both of the following: (1) isolates thermally sensitive components from the environment; and (2) removes heat from thermally sensitive components. Consequently, to effectively manage the temperature of discrete thermal components in downhole tools, the present invention has been developed. Other objects and advantages of the invention will appear from the following description.

SUMMARY OF THE EMBODIMENTS

The temperature management system manages the temperature of one or more thermal components in downhole tools, such as those suspended on a drill string or a wireline. The temperature management system comprises a heat exchanger thermally coupled with the thermal component, or thermally coupled with a chassis of thermal components. The temperature management system also comprises a heat storage unit. A thermal conduit system thermally couples the heat exchanger and heat storage unit. The thermal conduit system transfers heat absorbed by the heat exchanger from the one or more thermal components to the heat storage unit. The heat storage unit may in turn absorb the heat from the thermal conduit or directly from the one or more thermal components. A second, different heat exchanger coupled to the heat storage unit may be utilized to efficiently transfer heat from the thermal conduit. The heat storage unit may be disposed locally to the thermal component, or may be remotely disposed, e.g., the heat storage unit may be in the same cavity as the one or more thermal components, or may be located external to the thermal component cavity. The temperature management system is thus able to discretely manage the temperature of thermal components inside a cavity instead of managing the temperature of the cavity as a whole.

In another embodiment of the invention, the thermal conduit system comprises a closed loop, coolant fluid conduit system. A fluid transfer device circulates coolant fluid through the conduit system. As the coolant fluid circulates through the thermal conduit system, the coolant flows through the heat exchanger, absorbing heat from the heat exchanger and enabling the heat exchanger to absorb more heat from the thermal component. After exiting the heat exchanger coupled to the thermal component(s), the heated coolant fluid flows to the heat storage unit wherein the heat storage unit absorbs heat from the coolant, thus enabling the coolant to absorb more heat from the one or more thermal components. After exiting the heat storage unit, the coolant fluid may circulate through the temperature management system.

In one embodiment of the invention, the temperature management system may comprise an open loop, coolant fluid conduit system. Instead of re-circulating coolant fluid through the fluid conduit system, the temperature management system may store or even expel the coolant fluid after the coolant fluid flows through the heat exchanger and the heat storage unit.

In another embodiment of the invention, for multiple thermal components, each thermal component or group of components may require a separate heat exchanger. To accommodate the multiple heat exchangers, the thermal conduit system comprises thermal conduit branches that branch out to each heat exchanger and then rejoin or recombine for flow of the coolant fluid to the heat storage unit. The multiple heat exchangers may be arranged in series, in parallel, or any combination of series and/or parallel. Alternatively, the temperature management system may further comprise valves for controlling fluid flow through each thermal conduit branch if the conduit system is a coolant fluid conduit system. The valves can control the flow through the thermal conduit branches to isolate particular heat exchangers from the temperature management system when the cooling of that component or group of components is not necessary.

In another embodiment of the invention, the temperature management system comprises a thermal barrier to the downhole environment. The thermal barrier acts to hinder heat transfer from the downhole environment to the thermal components. Such a barrier may be an insulated vacuum "flask" or any other suitable barrier that thermally isolates at least the one or more thermal components and/or components of the temperature management system described above.

Thus, the embodiments comprise a combination of features and advantages that overcome the problems of prior art devices. The various characteristics described above, as well as other features, will be readily apparent to those skilled in the art upon reading the following detailed description of the embodiments, and by referring to the accompanying drawings.

BRIEF DESCRIPTION OF THE DRAWINGS

For a more detailed description of the embodiments, reference will now be made to the following accompanying drawings.

DETAILED DESCRIPTION OF THE EMBODIMENTS

The present invention relates to a thermal component temperature management system and includes embodiments of different forms. The drawings and the description below disclose specific embodiments of the present invention with the understanding that the embodiments are to be considered an exemplification of the principles of the invention, and are not intended to limit the invention to that illustrated and described. Further, it is to be fully recognized that the different teachings of the embodiments discussed below may be employed separately or in any suitable combination to produce desired results. The term "couple". "couples", or "thermally coupled" used herein is intended to mean either an indirect or direct connection. Thus, if a first device couples to a second device, that connection may be through a direct connection, e.g., via conduction though one or more devices, or through an indirect connection; e.g., via convection or radiation.

Figure 1:
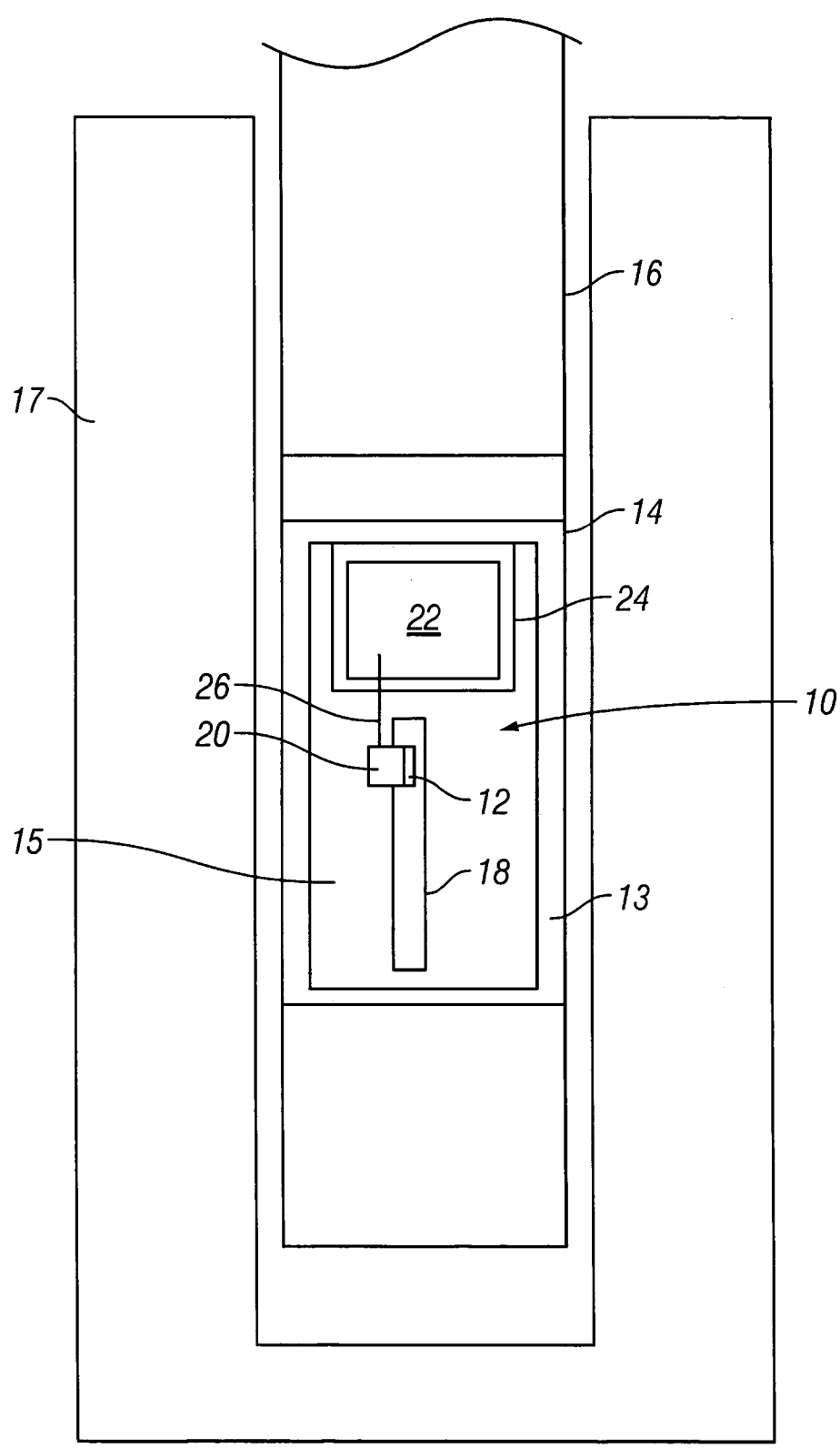
FIG. 1 is a schematic view showing a temperature management system.

FIG. 1 illustrates a temperature management system 10 disposed in a downhole tool 14 such as on a drill string 16 for drilling a borehole 13 in a formation 17. The temperature management system 10 might also be used in a downhole wireline tool, a permanently installed downhole tool, or a temporary well testing tool. Downhole, the ambient temperature can be extremely thermally harsh, sometimes exceeding 200° C. However, the temperature management system 10 may also be used in other situations and applications where the surrounding environment ambient temperature is either greater than or less than that of the thermal components being cooled.

The temperature management system 10 discretely manages the temperature of a thermal component 12 mounted on a board 18 in the downhole tool 14. The thermal component 12 comprises, but is not limited to, heat-dissipating components, heat-generating components, and/or heat-sensitive components. An example of a thermal component 12 may be an integrated circuit, e.g., a computer chip, or other electrical or mechanical device that is heat-sensitive, or whose performance is deteriorated by high temperature operation, or a device that generates heat. The board 18 is in turn mounted on a chassis (not shown) and installed within a cavity 15 of the tool 14. The temperature management system 10 further comprises a heat exchanger 20 thermally coupled with the thermal component 12, In one embodiment of the invention, the heat exchanger 20 is thermally coupled via a conductive path to the thermal component 12. However, in other embodiments of the inventions the heat exchanger 20 may be thermally coupled with the thermal component 12 by radiation or convection. The heat exchanger 20 may be any appropriate type of heat exchanger, e.g., a conduction heat exchanger that uses heat conduction to transfer the heat through solids. The heat exchanger 20 may also comprise multiple layers of the same or different materials.

The temperature management system 10 also comprises a heat storage unit 22 preferably comprising a phase change material. Phase change material is designed to take advantage of the heat absorbed during the phase change at certain temperature ranges. For example, the phase change material may be a eutectic material. Eutectic material is an alloy having a component composition designed to achieve a desired melting point for the material. The desired melting point takes advantage of latent heat of fusion to absorb energy. Latent heat is the energy absorbed by the material as it changes phase from solid into liquid. Thus, when the material changes its physical state, it absorbs energy without a change in the temperature of the material. Therefore, additional heat will only change the phase of the material, not its temperature. To take advantage of the latent heat of fusion, the eutectic material may have a melting point below the desired maintenance temperature of the thermal component 12.

The heat storage unit 22 is stored in a jacket 24 capable of withstanding the extreme downhole temperatures and shock conditions. For example, the jacket 24 can be a stainless steel container. Because the heat storage unit 22 may undergo a phase change, the jacket 24 must also be capable of withstanding the contraction and/or expansion of the heat storage unit 22.

The heat exchanger 20 and the heat storage unit 22 are thermally coupled via a thermal conduit system 26. The thermal conduit system 26 comprises a thermally conductive material for transferring heat from the heat exchanger 20 to the heat storage unit 22. The thermal conduit system 26 may connect to the heat exchanger 20 and the heat storage unit 22 by any suitable means such as welding joints or threaded connections.

The temperature gradient between thermal component 12 and the heat storage unit 22 is such that the heat storage unit 22 absorbs the heat from the thermal component 12 through the heat exchanger 20 and the thermal conduit system 26. The temperature management system 10 removes enough heat to maintain the thermal component 12 at or below its rated temperature, which may be e.g. 125° C. In one embodiment of the invention, the temperature management system 10 may maintain the component 12 at or below 100° C., or even at or below 80° C. Typically, the lower the temperature, the longer the life of the thermal component 12.

Thus, the temperature management system 10 may not manage the temperature of the entire cavity 15 or even the entire electronics chassis, but does manage the temperature of the thermal component 12 itself. When absorbing heat discretely from the thermal component 12, the temperature management system 10 may allow the temperature of the cavity 15 to reach a higher temperature than that of the thermal components. Absorbing heat discretely from the thermal component 12 thus extends the useful life of the thermal component 12, despite the temperature of the cavity 15 being higher. This allows the thermal component to operate a longer duration at a given temperature for a given volume of heat storage unit than possible if the temperature of the entire cavity is managed.

Because the temperature of the downhole environment may be greater than the temperature of the heat storage unit 22, in one embodiment of the invention, the heat removed from the thermal component 12 and transmitted by the thermal conduit 26 is stored in the heat storage unit 22. In other embodiments of the invention, the heat removed from the thermal component 12 may be absorbed directly by the heat storage unit 22; e.g., via conduction by being in contact with the heat exchanger, or the heat may be absorbed by the heat storage unit 22 via convection or radiation from the heat exchanger. Consequently, the amount of heat the heat storage unit 22 can absorb from the thermal component 12 limits the temperature management system 10. When the heat storage unit 22 reaches its heat storage capacity, the downhole tool 14 is brought up closer to the surface or removed from the well 13 and the heat stored in the heat storage unit 22 dissipates into the cooler environment.

Figure 2:
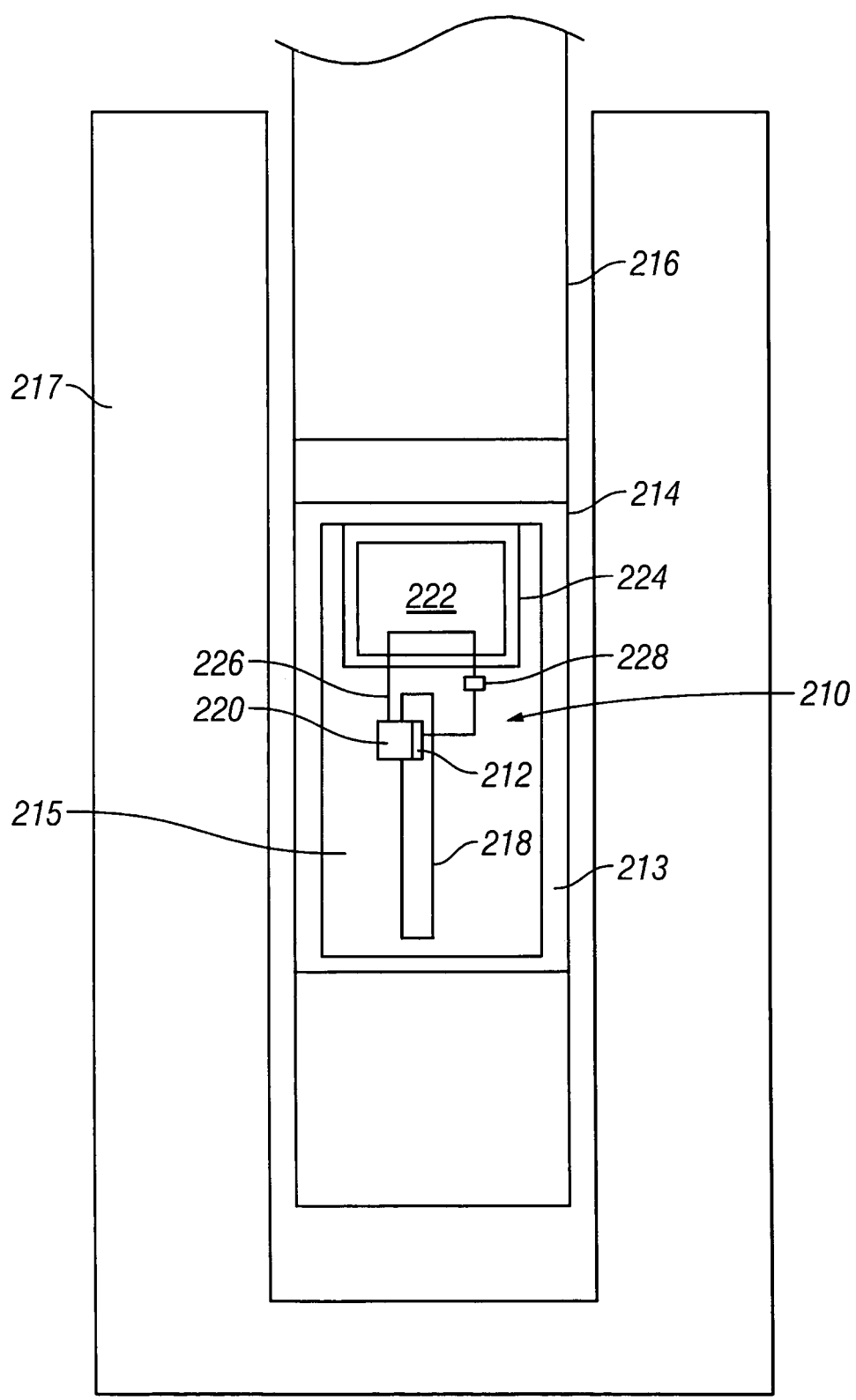
FIG. 2 is a schematic view showing a second embodiment temperature management system.
Figure 3:
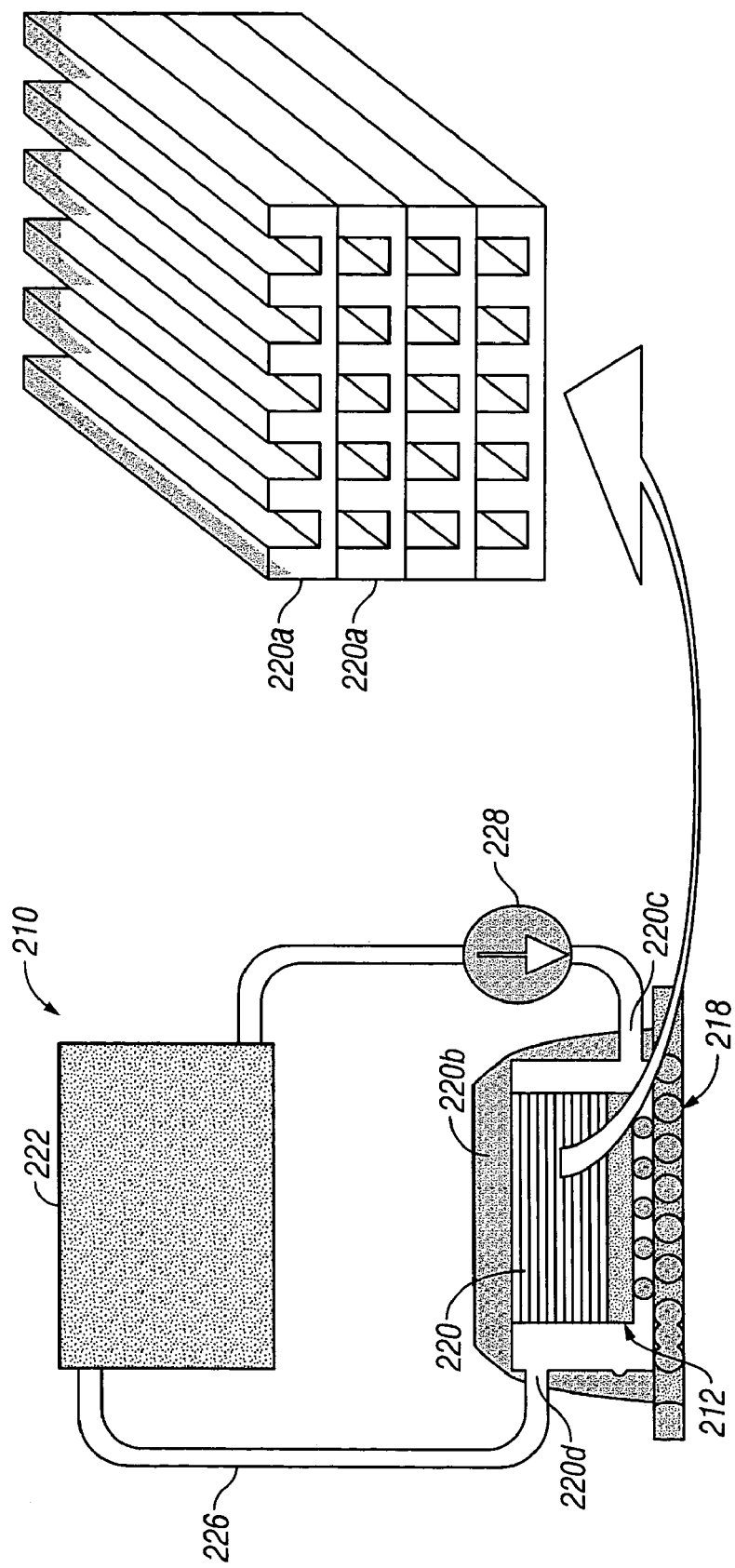
FIG. 3 is a schematic view showing the components of the second embodiment temperature management system.

FIGS. 2 and 3 show an alternative temperature management system 210. The temperature management system 210 also discretely cools a thermal component 212 using a heat exchanger 220 to absorb heat from the thermal component 212. The heat exchanger 220 transfers the absorbed heat through a thermal conduit system 226 to a heat storage unit 222. The heat storage unit 222 also comprises a phase change material and is enclosed in a jacket 224.

Unlike the temperature management system 10, the heat exchanger 220 in the temperature management system 210 is a micro-capillary heat exchanger. In one embodiment, the micro-capillary heat exchanger 220 is a micro-channel, cold plate heat exchanger with stacked plates 220a enclosed in a housing 220b shown in FIG. 3. The housing 220b includes inlet port 220c and outlet port 220d. To reduce the pressure drop through the micro-capillary exchanger 220, the plates 220a of the exchanger 220 may be stacked as shown in FIG. 3. The number of stacked plates 220a may be varied to optimize pressure drop, heat transfer, and other characteristics. In addition, the plates 220a of the micro-capillary exchanger 220 may be of any suitable material, such as copper or silicon.

The temperature management system 210 also differs from the temperature management system 10 shown in FIG. 1 in that the thermal conduit system 226 is a coolant fluid conduit system. The thermal conduit system 226 allows the passage of coolant fluid from the heat exchanger 220 to the heat storage unit 222. The thermal conduit system 226 also allows the coolant fluid to return to the heat exchanger 220 to form a closed-loop system.

In one embodiment of the invention, located in the thermal conduit system 226 is a fluid transfer device 228 for flowing the coolant fluid through the thermal conduit system 226. The fluid transfer device 228 may be any suitable device for flowing the coolant fluid. By way of non-limiting example, the fluid transfer device may be a pump, such as a mini-pump or a micro-pump. The fluid transfer device 228 may be located at any suitable location in the thermal conduit system 226. In addition, the fluid transfer device 228 may also circulate the coolant fluid in either flow direction. In other embodiments of the invention, the fluid in the thermal conduit system 226 flows via convection e.g., by maintaining a temperature differential between any two points in the system.

The coolant fluid flowing within the thermal conduit system 226 is a coolant fluid that may be thermally coupled with the heat exchanger 220 and the heat storage unit 222. The coolant fluid may be water or any other suitable fluid. The temperature management system 210 may be a single-phase temperature management system. Thus, the coolant is a liquid and does not undergo a phase change while it circulates through the temperature management system 210. Alternatively, the temperature management system 210 may be a two-phase system where the coolant fluid changes to a gas phase and then back to the fluid phase as it cycles through the temperature management system 210. The two-phase system coolant fluid absorbs heat as it changes from the liquid to the gas phase and releases heat as it changes from the gas to the liquid phase.

In operation, the coolant travels from the fluid transfer device 228 to the heat exchanger 220 where the coolant is thermally coupled with the heat exchanger 220. The coolant passes into the inlet port 220c of the heat exchanger 220 and flows through the stacked plates 220a. As the coolant flows through the heat exchanger 220, it absorbs heat from the heat exchanger 220, thus allowing the heat exchanger 220 to absorb more heat from the thermal component 212. Upon exiting the heat exchanger 220 through outlet port 220d, the heated coolant flows through the thermal conduit system 226 to the heat storage unit 222. The heat storage unit 222 absorbs heat from the coolant, returning the coolant to a lower temperature. The thermal conduit system 226 maintains the coolant fluid separate from the phase change material inside the heat storage unit 222. The path of the thermal conduit system 226 through the heat storage unit 222 may be straight or tortuous depending on the performance specifications of the temperature management system 210. After exiting the heat storage unit 222, the coolant flows to the fluid transfer device 228, where it circulates through the temperature management system 210 again.

The temperature management system 210 removes enough heat to maintain the thermal component 212 at or below its rated temperature, which is typically no more than 125° C. For example, the temperature management system 210 may maintain the thermal component 212 at or below 100° C., or even at or below 80° C. The lower the temperature, the longer the life of the thermal component 212.

Thus, the temperature management system 210 does not absorb heat from the entire cavity 215 or even the entire electronics chassis, but only the thermal component 212 itself. When absorbing heat discretely from the thermal component 212, the temperature management system 210 may allow the general temperature of the cavity 215 to reach a higher temperature than prior art cooling systems. However, even though the temperature of the cavity 215 may be higher, the temperature of the discrete thermal component 212 will be lower than prior art cooling system components. Absorbing heat discretely from the component 212 thus extends the useful life of the thermal component 212 as compared to prior art cooling systems, despite the temperature of the cavity 215 being higher.

Because the temperature of the downhole environment may be greater than the temperature of the heat storage unit 222, the heat removed from the coolant is stored in the heat storage unit 222. Consequently, the amount of heat the heat storage unit 222 can absorb from the thermal component 212 limits the temperature management system 210. When the heat storage unit 222 reaches its heat storage capacity, the downhole tool 214 is brought up closer to the surface or removed from the well 213 and the heat stored in the heat storage unit 222 dissipates into the cooler environment.

Figure 4:
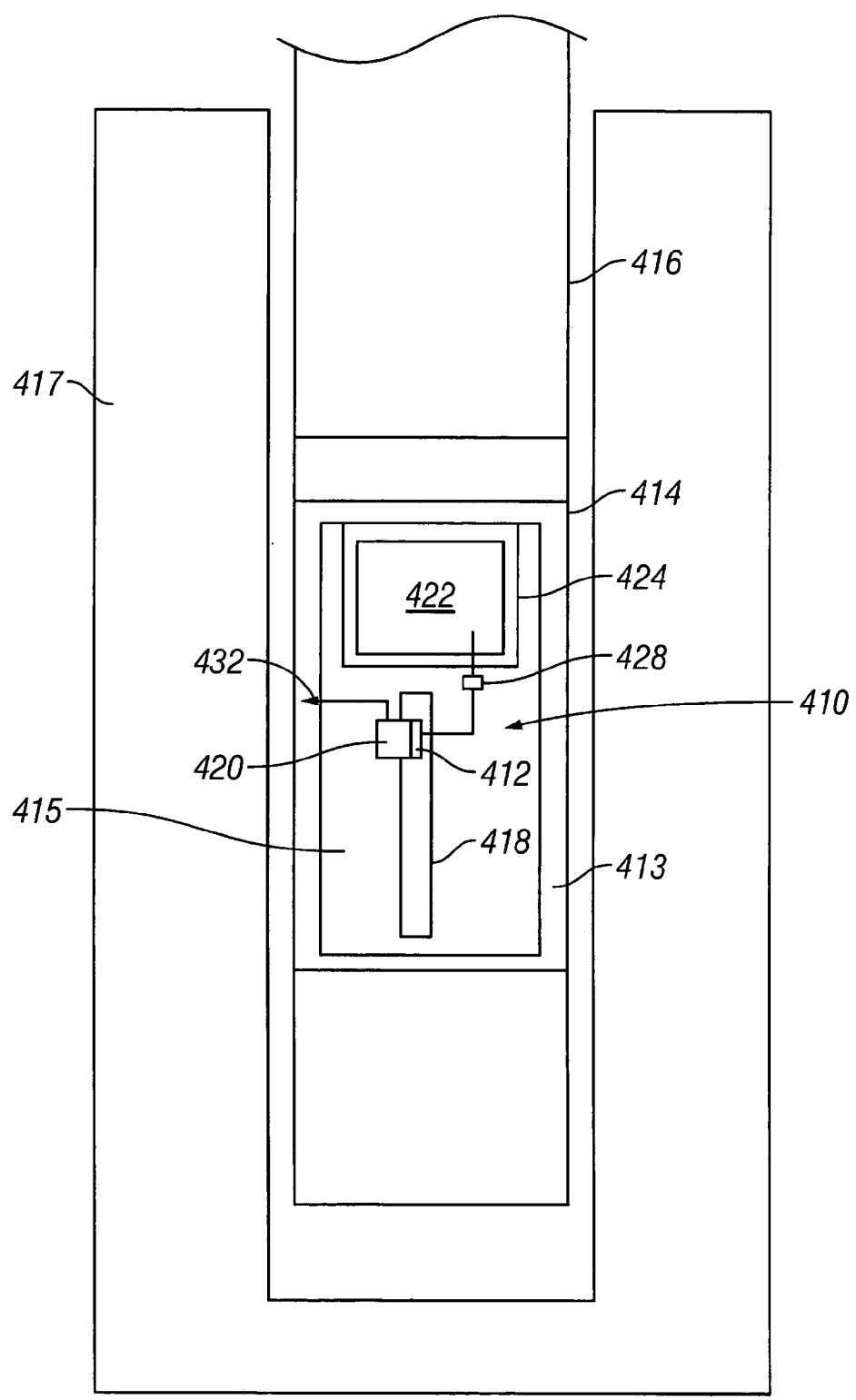
FIG. 4 is a schematic view showing a third embodiment temperature management system.

FIG. 4 shows an alternative temperature management system 410. The temperature management system 410 also discretely absorbs heat from a thermal component 412 using a heat exchanger 420. The heat exchanger 420 in the temperature management system 410 is also a micro-capillary heat exchanger similar to the heat exchanger 220 shown in FIGS. 3 and 4. The heat exchanger 420 transfers the absorbed heat through a thermal conduit system 426 from a heat storage unit 422. The heat storage unit 422 comprises a phase change material and is enclosed in a jacket 424.

The temperature management system 410 also uses a fluid thermal conduit system 426. The thermal conduit system 426 allows the passage of the coolant fluid from the heat storage unit 422 to the heat exchanger 420. Unlike the thermal conduit system 226 shown in FIG. 2 however, the thermal conduit system 426 is an open loop system as shown in FIG. 4. Thus, the coolant fluid cycles through the temperature management system 410 only once and then is expelled from the temperature management system 410.

Located in the thermal conduit system 426 is a fluid transfer device 428 for flowing the coolant fluid through the thermal conduit system 426. The fluid transfer device may be located at any suitable location in the temperature management system 410. The fluid transfer device 428 may also be any suitable device for flowing the coolant fluid. By way of non-limiting example, the fluid transfer device may be a pump, such as a mini-pump or a micro-pump. The coolant fluid flowing within the thermal conduit system 426 is thermally coupled with the heat exchanger 420 and the heat storage unit 422. The coolant fluid may be water or any other suitable fluid.

Located in the thermal conduit system 426 is a fluid transfer device 428 for flowing the coolant fluid through the thermal conduit system 426. The fluid transfer device may be located at any suitable location in the temperature management system 410. The fluid transfer device 428 may also be any suitable device for flowing the coolant fluid. By way of non-limiting example, the fluid transfer device may be a pump, such as a mini-pump or a micro-pump. The coolant fluid flowing within the thermal conduit system 426 is in thermal communication with the heat exchanger 420 and the heat sink 422. The coolant fluid may be water or any other suitable fluid.

The temperature management system 410 is a single-phase temperature management system. Thus, the coolant is a liquid and does not undergo a phase change while it circulates through the temperature management system 410. Alternatively, the temperature management system 410 may be a two-phase system where the coolant fluid changes to a gas phase as it flows through the temperature management system 410. The two-phase system coolant fluid absorbs heat as it changes from the liquid to the gas phase.

As shown in FIG. 4, the coolant fluid travels from the low temperature heat storage unit 422 to the heat exchanger 420 where the coolant is thermally coupled with the heat exchanger 420. The heat exchanger 420 is thermally coupled with the thermal component 412 by conduction, convection, and/or radiation paths. As the coolant flows through the heat exchanger 420, it absorbs heat from the heat exchanger 420, allowing the heat exchanger 420 to absorb more heat from the thermal component 412. Upon exiting the heat exchanger 420, the heated coolant flows through the thermal conduit system 426 and is expelled from the temperature management system 410 as shown by direction arrow 432.

The temperature management system 410 removes enough heat to maintain the thermal component 412 at or below its rated temperature, which is typically no more than 125° C. For example, the temperature management system 410 may maintain the thermal component 412 at or below 100° C., or even at or below 80° C. The lower the temperature, the longer the life of the thermal component 412.

Thus, the temperature management system 410 does not absorb heat from the entire cavity 415 or even the entire electronics chassis, but only the thermal component 412 itself. When discretely absorbing heat from the thermal component 412, the temperature management system 410 may allow the general temperature of the cavity 415 to reach a higher temperature than prior art cooling systems. However, even though the temperature of the cavity 415 may be higher, the temperature of the discrete thermal component 412 will be lower than prior art cooling system components. Discretely absorbing heat from the thermal component 412 thus extends the useful life of the thermal component 412 as compared to prior art cooling systems, despite the temperature of the cavity 415 being higher.

The amount of cooling fluid and the heat absorption capacity of the heat storage unit 422 limit the amount of heat the temperature management system 410 can absorb from the thermal component 412. When the cooling fluid is depleted, the downhole tool 414 is removed from the well 413 to be supplied with more coolant fluid.

Figure 5:
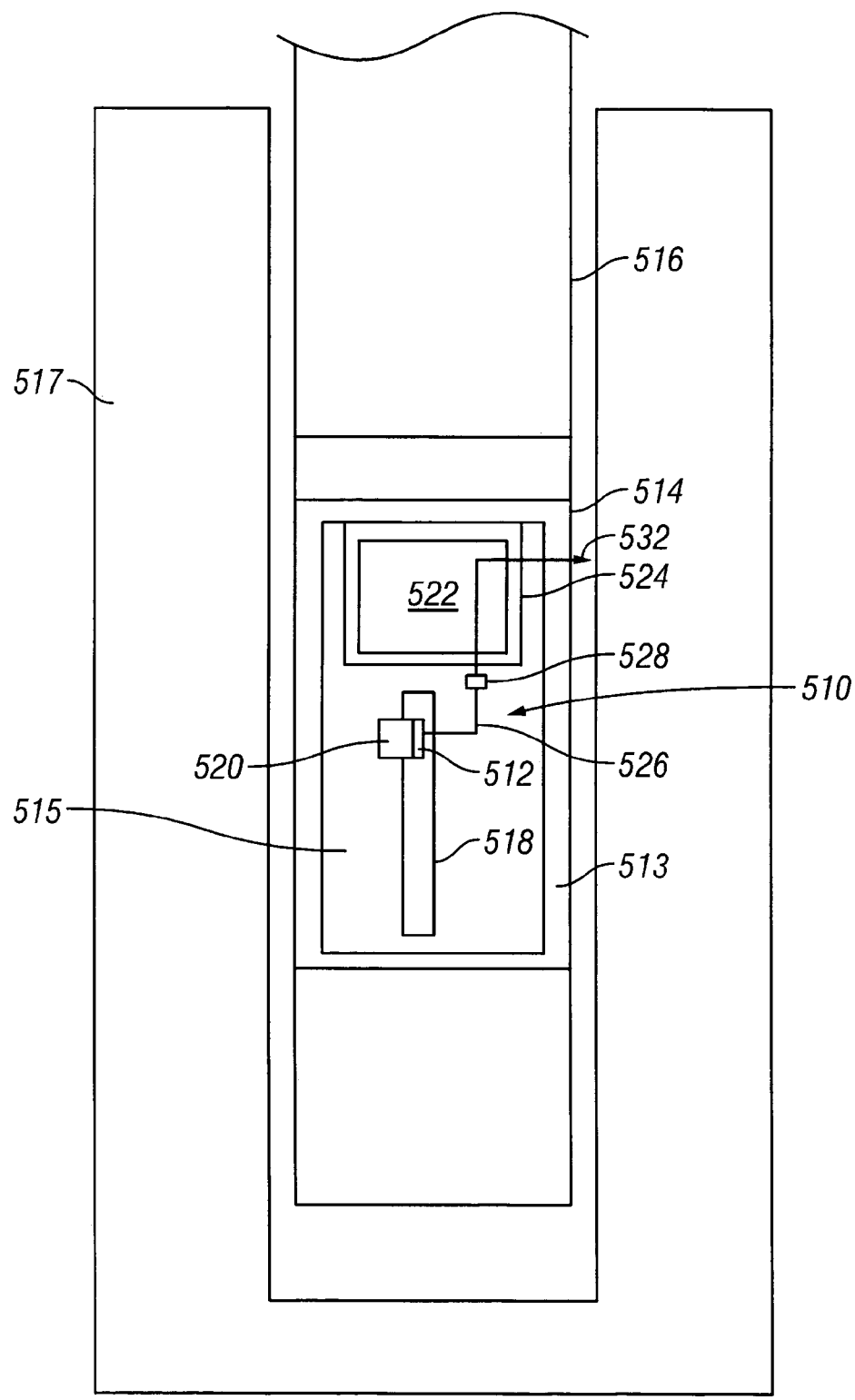
FIG. 5 is a schematic view showing a fourth embodiment temperature management system.

FIG. 5 shows an alternative temperature management system 510. The temperature management system 510 may be configured such that the coolant fluid flows through a heat exchanger 520 and then through the thermal conduit system 526 to the heat storage unit 522, similar to the temperature management system 210 shown in FIGS. 2 and 3. As the fluid transfer device 528 flows coolant through the heat storage unit 522, the heat storage unit 522 absorbs heat from the coolant fluid. The thermal conduit system 526 maintains the coolant fluid separate from the phase change material inside the heat storage unit 522. The path of the thermal conduit system 526 through the heat storage unit 522 may be straight or tortuous depending on the performance specifications of the temperature management system 510. Unlike the temperature management system 210 shown in FIG. 2, the temperature management system 510 is an open loop system similar to temperature management system 410 shown in FIG. 4. Thus, after exiting the heat storage unit 522, the coolant is expelled from the temperature management system 510.

Located in the thermal conduit system 526 is a fluid transfer device 528 for flowing the coolant fluid through the thermal conduit system 526. The fluid transfer device may be located at any suitable location in the temperature management system 510. The fluid transfer device 528 may also be any suitable device for flowing the coolant fluid. By way of non-limiting example, the fluid transfer device may be a pump, such as a mini-pump or a micro-pump. The coolant fluid flowing within the thermal conduit system 526 is thermally coupled with the heat exchanger 520 and the heat storage unit 522. The coolant fluid may be water or any other suitable fluid.

The temperature management system 510 is a single-phase temperature management system. Thus, the coolant is a liquid and does not undergo a phase change while it circulates through the temperature management system 510. Alternatively, the temperature management system 510 may be a two-phase system where the coolant fluid changes to a gas phase as it flows through the temperature management system 510. The two-phase system coolant fluid absorbs heat as it changes from the liquid to the gas phase.

As shown in FIG. 5, the coolant fluid travels through the heat exchanger 520. The heat exchanger 520 is thermally coupled with the thermal component 512 by conduction, convection, and/or radiation paths. As the coolant flows through the heat exchanger 520, it absorbs heat from the heat exchanger 520, allowing the heat exchanger 520 to absorb more heat from the thermal component 512. Upon exiting the heat exchanger 520, the heated coolant flows through the thermal conduit system 526 and then through the heat storage unit 522. After passing through the heat storage unit 522, the coolant is expelled from the temperature management system 510 as shown by direction arrow 532.

The temperature management system 510 removes enough heat to maintain the thermal component 512 at or below its rated temperature, which is typically no more than 125° C. For example, the temperature management system 510 may maintain the thermal component 512 at or below 100° C., or even at or below 80° C. The lower the temperature, the longer the life of the thermal component 512.

Thus, the temperature management system 510 does not absorb heat from the entire cavity 515 or even the entire electronics chassis, but only the thermal component 512 itself. When discretely absorbing heat from the thermal component 512, the temperature management system 510 may allow the general temperature of the cavity 515 to reach a higher temperature than prior art cooling systems. However, even though the temperature of the cavity 515 may be higher, the temperature of the discrete thermal component 512 will be lower than prior art cooling system components. Discretely absorbing heat from the thermal component 512 thus extends the useful life of the thermal component 512 as compared to prior art cooling systems, despite the temperature of the cavity 515 being higher.

The amount of cooling fluid and the heat absorption capacity of the heat storage unit 522 limit the amount of heat the temperature management system 510 can absorb from the thermal component 512. When the cooling fluid is depleted, the downhole tool 514 is removed from the well 513 to be supplied with more coolant fluid.

Figure 6:
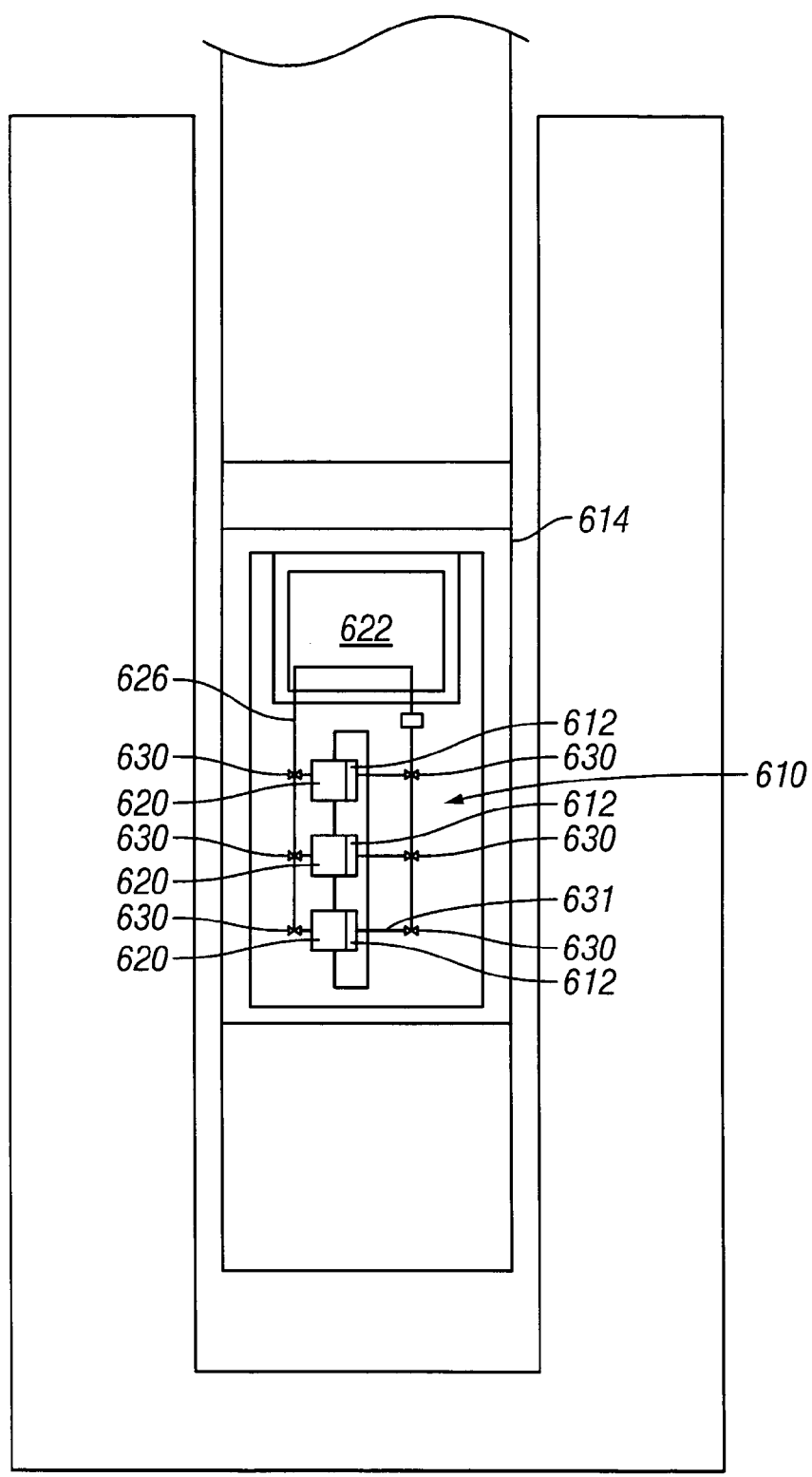
FIG. 6 is a schematic view showing a fifth embodiment temperature management system.

FIG. 6 shows another alternative temperature management system 610. The temperature management system 610 can be configured for any of the preceding temperature management systems 10, 210, 410, 510. However, as an example only, the temperature management system 610 will be discussed with reference to the temperature management system 210 shown in FIG. 2. Unlike the previous temperature management systems, the temperature management system 610 may be used to remove heat from multiple thermal components 612 with multiple heat exchangers 620. A single heat exchanger 620 may also remove heat from a group of thermal components 612. To accommodate the multiple heat exchangers 620, the thermal conduit system 626 additionally comprises thermal conduit branches 631 directing coolant to each heat exchanger 620. FIG. 6 shows the heat exchangers 620 connected in parallel. However, the heat exchangers 620 may also be in series, or any combination of series and/or parallel. After the coolant exits each heat exchanger 620, the thermal conduit branches 631 rejoin to form a single thermal conduit flowing to the heat storage unit 622. Alternatively, there are valves 630 for controlling fluid flow to each heat exchanger 620. The valves 630 can control flow of the coolant fluid to isolate particular heat exchangers 620 from the thermal conduit system 626 when the cooling of that component or group of components 612 is not necessary.

Figure 7:
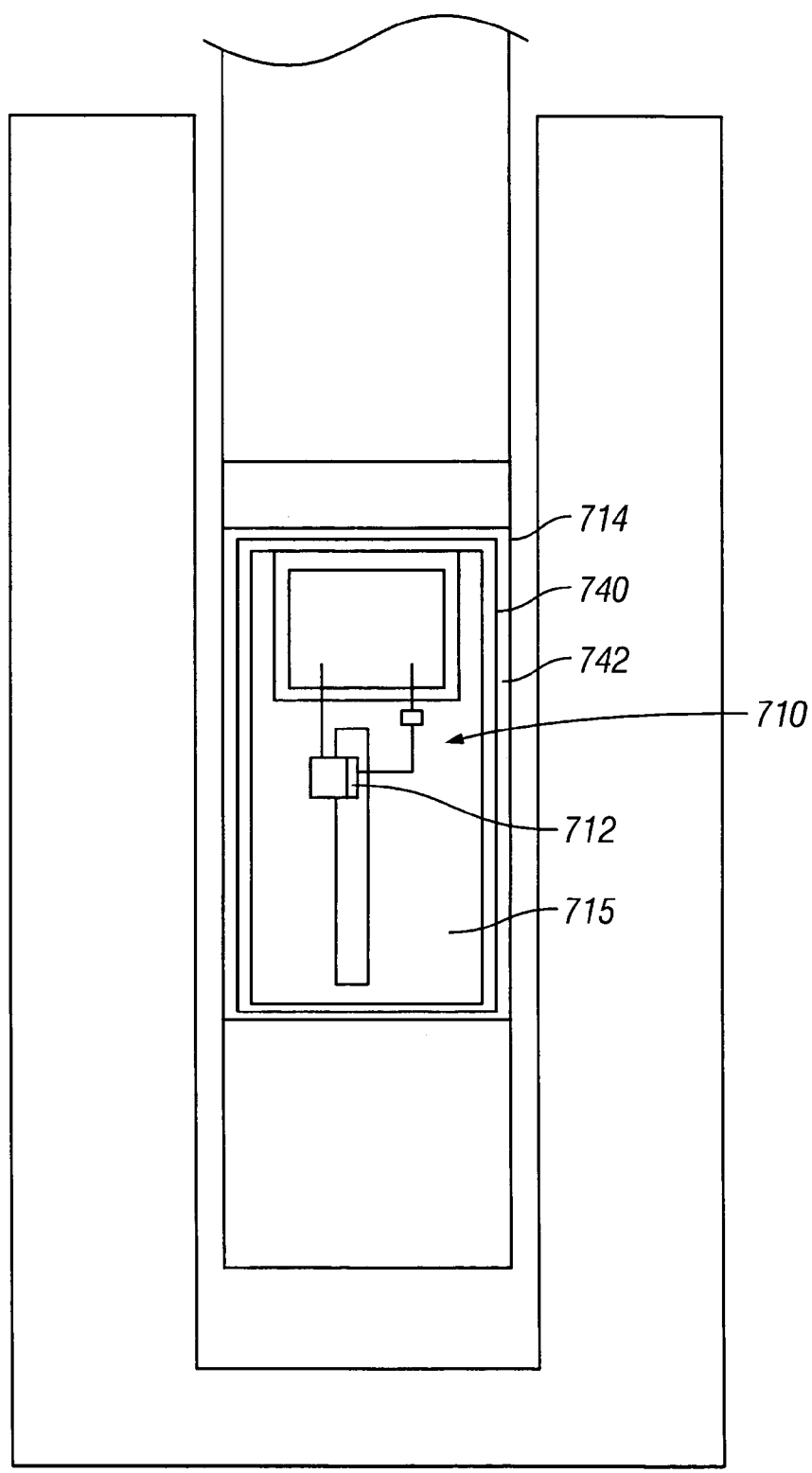
FIG. 7 is a schematic view showing a sixth embodiment temperature management system.

FIG. 7 shows another alternative temperature management system 710. The temperature management system 710 can be configured for any of the preceding temperature management systems 10, 210, 410, 510, 610. However, as an example only, the temperature management system 710 will be discussed with reference to the temperature management system 210 shown in FIG. 2. In addition to the components of the temperature management system 210 shown in FIG. 2, the temperature management 710 further comprises a thermal barrier 740 enclosing the entire temperature management system 710 and chassis. The thermal barrier 740 thus separates the temperature management system 710 from the downhole environment. Although FIG. 7 shows the thermal barrier 740 enclosing the entire temperature management system 710, the thermal barrier 740 may also enclose only a portion of the temperature management system 710. The thermal barrier 740 hinders heat transfer from the outside environment to the temperature management system 710 and the thermal component 712. By way of non-limiting example, the barrier 740 may be an insulated vacuum "flask", a vacuum "flask" filled with an insulating solid, a material-filled chamber, a gas-filled chamber, a fluid-filled chamber, or any other suitable barrier. In addition, the space 742 between the thermal barrier 740 and the tool 714 may be evacuated. Creating a vacuum aids in hindering heat transfer to the temperature management system 710 and the thermal component 712. The temperature management system 710 may also cool multiple thermal components, as in the temperature management system 610 shown in FIG. 6.

While specific embodiments have been shown and described, modifications can be made by one skilled in the art without departing from the spirit or teaching of this invention. The embodiments as described are exemplary only and are not limiting. Many variations and modifications of the system and apparatus are possible and are within the scope of the invention. Accordingly, the scope of protection is not limited to the embodiments described, but is only limited by the claims that follow, the scope of which shall include all equivalents of the subject matter of the claims.

What is claimed is:

1. A temperature management system for the temperature management of a thermal component comprising:
    a heat exchanger thermally coupled with the thermal component;
    a heat storage unit comprising a phase change material enclosed in a jacket;
    a thermal conduit system thermally coupling the heat exchanger with the heat storage unit; and
    where the heat exchanger, heat storage unit, and thermal conduit system are in a downhole tool; and wherein said heat storage unit absorbs and stores heat from the thermal component and maintains all phases of the phase change material within the heat storage unit and within the jacket.

2. The temperature management system of claim 1 where the heat exchanger is a micro-capillary, cold plate heat exchanger.

3. The temperature management system of claim 1 where the thermal conduit system comprises a thermally conductive material.

4. The temperature management system of claim 1 where the thermal conduit system comprises a coolant fluid conduit system for the flow of a coolant fluid.

5. The temperature management system of claim 4 further comprising a fluid transfer device for flowing the coolant fluid through the thermal conduit system.

6. The temperature management system of claim 1 where the temperature management system and the thermal component are in a tool selected from the group consisting of a downhole drill string tool, a downhole wireline tool, a permanently installed downhole tool, or a temporary well testing tool.

7. The temperature management system of claim 1 where the thermal component is selected from the group consisting of a heat generating component, a heat dissipating component, or a heat sensitive component.

8. The temperature management system of claim 1 where the thermal component is in an environment with a higher temperature than the thermal component.

9. The temperature management system of claim 1 where the thermal component is in an environment with a lower temperature than the thermal component.

10. The temperature management system of claim 1 where the phase change material comprises a eutectic material.

11. The temperature management system of claim 1 where the temperature management system is at least partially contained within a thermal baffler.

12. The temperature management system of claim 11 where the thermal baffler comprises an evacuated container.

13. The temperature management system of claim 12 where the evacuated container is filled with a thermally hindering material.

14. The temperature management system of claim 5 where the fluid transfer device comprises a pump.

15. The temperature management system of claim 1 comprising more than one heat exchanger and wherein the thermal conduit system comprises more than one thermal conduit branch allowing fluid flow through the heat exchangers.

16. The temperature management system of claim 15 further comprising a valve for controlling fluid flow through the heat exchangers.

17. The temperature management system of claim 15 where the heat exchangers are arranged in the thermal conduit system in parallel.

18. The temperature management system of claim 17 comprising a valve for controlling fluid flow through the heat exchangers.

19. The temperature management system of claim 15 where the heat exchangers are arranged in the thermal conduit system in series.

20. The temperature management system of claim 19 comprising a valve for controlling fluid flow through the heat exchangers.

21. The temperature management system of claim 15 where the heat exchangers are arranged in a combination of series and parallel.

22. The temperature management system of claim 21 comprising a valve for controlling fluid flow through the heat exchangers.

23. The temperature management system of claim 4 where the thermal conduit system is closed loop system.

24. The temperature management system of claim 4 where the thermal conduit system is an open loop system.

25. The temperature management system of claim 1 where the heat exchanger is thermally coupled by a conductive path to the thermal component.

26. The temperature management system of claim 1 where the heat exchanger is thermally coupled with the thermal component by at least one of convection and radiation.

27. The temperature management system of claim 1 where the thermal conduit system thermally couples the heat exchanger with the heat sink via at least one of conduction, convection, and radiation.

28. The temperature management system of claim 1 further comprising a second heat exchanger to transfer heat from the thermal conduit system to the heat sink.

29. A temperature management system for temperature management a thermal component comprising:
    a micro-capillary, cold plate heat exchanger thermally coupled with the thermal component;
    a heat storage unit;
    a thermal conduit system thermally coupling the heat exchanger with the heat storage unit, the thermal conduit system comprising a coolant fluid conduit system for the flow of a coolant fluid;
    a fluid transfer device for flowing the coolant fluid through the thermal conduit system; and
    where the heat exchanger, heat storage unit, thermal conduit system, and fluid transfer device are in a downhole tool.

30. The temperature management system of claim 29 where the temperature management system and the thermal component are in a tool selected from the group consisting of a downhole drill string tool, a downhole wireline tool, a permanently installed downhole tool, or a temporary well testing tool.

31. The temperature management system of claim 29 where the thermal component is selected from the group consisting of a heat generating component, a heat dissipating component, or a heat sensitive component.

32. The temperature management system of claim 29 where the thermal component is in an environment with a higher temperature than the thermal component.

33. The temperature management system of claim 29 where the thermal component is in an environment with a lower temperature than the thermal component.

34. The temperature management system of claim 29 where the heat storage unit comprises a phase change material.

35. The temperature management system of claim 34 where the phase change material comprises a eutectic material.

36. The temperature management system of claim 29 where the temperature management system is at least partially contained within a thermal baffler.

37. The temperature management system of claim 36 where the thermal baffler comprises an evacuated container.

38. The temperature management system of claim 37 where the evacuated container is filled with a thermally hindering material.

39. The temperature management system of claim 29 where the fluid transfer device comprises a pump.

40. The temperature management system of claim 29 comprising more than one heat exchanger and wherein the thermal conduit system comprises more than one thermal conduit branch allowing fluid flow through the heat exchangers.

41. The temperature management system of claim 40 further comprising a valve for controlling fluid flow through the heat exchangers.

42. The temperature management system of claim 40 where the heat exchangers are arranged in the thermal conduit system in parallel.

43. The temperature management system of claim 42 comprising a valve for controlling fluid flow through the heat exchangers.

44. The temperature management system of claim 40 where the heat exchangers are arranged in the thermal conduit system in series.

45. The temperature management system of claim 44 comprising a valve for controlling fluid flow through the heat exchangers.

46. The temperature management system of claim 40 where the heat exchangers are arranged in a combination of series and parallel.

47. The temperature management system of claim 46 comprising a valve for controlling fluid flow through the heat exchangers.

48. The temperature management system of claim 29 where the thermal conduit system is a closed loop system.

49. The temperature management system of claim 29 where the thermal conduit system is an open loop system.

50. The temperature management system of claim 29 where the heat exchanger is thermally coupled by a conductive path with the thermal component.

51. The temperature management system of claim 29 where the heat exchanger is thermally coupled with the thermal component by at least one of convection and radiation.

52. A method of absorbing heat from a thermal component comprising:
  absorbing heat from the thermal component with a heat exchanger thermally coupled with the thermal component in a downhole tool;
  transferring heat absorbed from the heat exchanger through a thermal conduit system in the downhole tool;
  storing heat transferred through the thermal conduit in a heat storage unit in the downhole tool, the heat storage unit comprising a phase change material enclosed in a jacket; and maintaining all phases of the phase change material within the heat storage unit and within the jacket.

53. The method of claim 52 further comprising:
  flowing coolant fluid through the thermal conduit system thermally connecting the heat exchanger to the heat storage unit using a fluid transfer device;
  absorbing heat from the heat exchanger with the coolant fluid as the coolant fluid flows through the heat exchanger; and
  absorbing heat from the coolant fluid with the heat storage unit as the coolant fluid flows through the heat storage unit.

54. The method of claim 53 where the phase change material is a eutectic material.

55. The method of claim 52 where the heat exchanger is a micro-capillary, cold plate heat exchanger.

56. The method of claim 52 where the thermal component is in a tool selected from the group consisting of a downhole drill string tool, a downhole wireline tool, a permanently installed downhole tool, or a temporary well testing tool.

57. The method of claim 52 where the thermal component is selected from the group consisting of a heat generating component, a heat dissipating component, or a heat sensitive component.

58. The method of claim 52 where the thermal component is in an environment with a higher temperature than the thermal component.

59. The method of claim 52 where the thermal component is in an environment with a lower temperature than the thermal component.

60. The method of claim 52 further comprising absorbing heat from the heat exchanger with the heat sink via at least one of conduction, convection, and radiation.

61. A method of absorbing heat from a thermal component comprising:
  absorbing heat from the thermal component with a heat exchanger thermally coupled with the thermal component in a downhole tool;
  flowing coolant fluid through a closed loop thermal conduit system thermally coupling the heat exchanger with a heat storage unit using a fluid transfer device, the thermal conduit system being in the downhole tool and the heat storage unit comprising a phase change material enclosed in a jacket;
  absorbing heat from the heat exchanger with the coolant fluid as the coolant fluid flows through the heat exchanger;
  absorbing heat from the coolant fluid with the heat storage unit as the coolant fluid flows through the heat storage unit; and
  maintaining all phases of the phase change material within the heat storage unit and within the jacket.

62. The method of claim 61 where the phase change material is a eutectic material.

63. The method of claim 61 where the heat exchanger is a micro-capillary, cold plate heat exchanger.

64. The method of claim 61 where the thermal component is in a tool selected from the group consisting of a downhole drill string tool, a downhole wireline tool, a permanently installed downhole tool, or a temporary well testing tool.

65. The method of claim 61 where the thermal component is selected from the group consisting of a heat generating component, a heat dissipating component, or a heat sensitive component.

66. The method of claim 61 where the thermal component is in an environment with a higher temperature than the thermal component.

67. The method of claim 61 where the thermal component is in an environment with a lower temperature than the thermal component.

* * * * *